(12) United States Patent
Ceravolo

(10) Patent No.: US 9,335,001 B1
(45) Date of Patent: May 10, 2016

(54) WEIGHT SUPPORTING APPARATUS AND METHOD

(71) Applicant: Frank Ceravolo, Port Orange, FL (US)

(72) Inventor: Frank Ceravolo, Port Orange, FL (US)

(73) Assignee: Frank Ceravolo, Port Orange, FL (US)

( * ) Notice: Subject to any disclaimer, the term of this patent is extended or adjusted under 35 U.S.C. 154(b) by 0 days.

(21) Appl. No.: 14/521,735

(22) Filed: Oct. 23, 2014

Related U.S. Application Data

(63) Continuation-in-part of application No. 14/195,469, filed on Mar. 3, 2014, now abandoned, which is a continuation-in-part of application No. 13/684,378, filed on Nov. 23, 2012, now Pat. No. 9,080,722.

(51) Int. Cl.
| | | |
|---|---|---|
| *B66F 3/10* | (2006.01) | |
| *F16M 11/26* | (2006.01) | |
| *B66F 3/00* | (2006.01) | |
| *F16M 11/22* | (2006.01) | |

(52) U.S. Cl.
CPC ..... *F16M 11/26* (2013.01); *B66F 3/00* (2013.01); *F16M 11/22* (2013.01); *F16M 2200/028* (2013.01)

(58) Field of Classification Search
USPC ............. 248/351, 354.1, 354.3, 354.5, 354.4, 248/419, 163.1, 172, 432, 188, 188.8, 248/188.91, 157; 254/11, 14, 418, 420, 254/419, 84, 32, 29 R, 30, 29 A, DIG. 16, 254/DIG. 4; 269/16, 71, 136, 137, 138, 291, 269/143, 249; 211/175
See application file for complete search history.

(56) References Cited

U.S. PATENT DOCUMENTS

| | | |
|---|---|---|
| 235,054 A | 11/1880 | Gatrell |
| 1,416,896 A | 5/1922 | Simmons |
| 1,499,280 A | 6/1924 | Alheit |
| 1,521,764 A | 1/1925 | Graver |
| 1,894,293 A | 1/1933 | Green |
| 1,896,715 A * | 2/1933 | Martinetti ................ 254/1 |
| 2,439,854 A | 4/1946 | Lipski |
| 2,514,095 A | 7/1950 | Schreiber |
| 2,529,292 A | 11/1950 | Greenfield |
| 2,912,703 A | 11/1959 | William |
| 3,028,142 A | 4/1962 | Friesen |
| 3,047,269 A | 7/1962 | Renshaw |
| 3,178,146 A | 4/1965 | Goodale |
| 3,232,584 A | 2/1966 | Miles |
| 3,313,505 A | 4/1967 | Petrie |
| 3,355,136 A | 11/1967 | Staples |
| 3,493,209 A | 2/1970 | Brammer |
| 3,599,923 A | 8/1971 | Hunnicutt |

(Continued)

*Primary Examiner* — Alfred J Wujciak
(74) *Attorney, Agent, or Firm* — Malin Haley DiMaggio & Bowen, P.A.

(57) ABSTRACT

An apparatus for partially supporting a vehicle is provided especially for a vehicle having a very limited area on its underside within which to safely apply an upward force, including vehicles with a small distance between the bottom of the chassis and the ground such as a sports car which allows the user to position a lifting jack at the proper access jack point for lifting a portion of the vehicle, and lifting the jack and vehicle portion upwardly to a desired height. The legs of the jack stand can be temporarily inserted into a support member engaging the vehicle and the jack. The jack stand includes a support member with open ends telescopically connected to a pair of rigid legs that are curved and each of the legs are telescopically attached to supporting bases using locking pins. Once the jack stand is installed, the lifting jack can be removed.

6 Claims, 18 Drawing Sheets

(56) References Cited

U.S. PATENT DOCUMENTS

| | | | | |
|---|---|---|---|---|
| 3,742,662 A | * | 7/1973 | Ballou | 52/126.7 |
| 3,765,650 A | * | 10/1973 | Eisenhauer | 254/133 R |
| 3,802,658 A | | 4/1974 | Binding | |
| 3,920,212 A | | 11/1975 | Westwood | |
| 3,970,278 A | | 7/1976 | Studer | |
| 4,009,855 A | | 3/1977 | Hoffmann | |
| 4,021,012 A | | 5/1977 | Miller | |
| 4,042,202 A | | 8/1977 | Molinari | |
| 4,141,526 A | | 2/1979 | John | |
| 4,245,808 A | | 1/1981 | John | |
| 4,330,104 A | | 5/1982 | Klok | |
| 4,404,780 A | | 9/1983 | Josephson | |
| 4,479,634 A | | 10/1984 | Blatz | |
| 4,553,727 A | | 11/1985 | Arzouman | |
| 4,708,362 A | * | 11/1987 | Raetz | 280/763.1 |
| 4,811,924 A | | 3/1989 | Walters | |
| 4,856,747 A | | 8/1989 | Gano | |
| 4,934,015 A | | 6/1990 | Mink | |
| 5,110,089 A | | 5/1992 | Slay | |
| 5,150,484 A | | 9/1992 | Whitten | |
| 5,165,665 A | | 11/1992 | Jolivette | |
| 5,180,131 A | | 1/1993 | Few | |
| 5,228,651 A | | 7/1993 | Warner | |
| 5,297,779 A | | 3/1994 | Collins | |
| D348,340 S | | 6/1994 | Collins | |
| 5,520,360 A | | 5/1996 | Wensman | |
| 5,660,637 A | | 8/1997 | Dodge | |
| 5,915,672 A | | 6/1999 | Dickey | |
| 5,979,854 A | | 11/1999 | Lundgren | |
| 6,062,524 A | * | 5/2000 | Jackson, Sr. | 248/352 |
| 6,119,284 A | | 9/2000 | Cosman | |
| 6,142,488 A | * | 11/2000 | Orr | 280/6.153 |
| 6,223,358 B1 | | 5/2001 | DePietro | |
| 6,334,598 B1 | | 1/2002 | Gutzke | |
| 6,443,413 B1 | | 9/2002 | Hawkins | |
| 6,644,615 B1 | | 11/2003 | Liu | |
| 6,691,983 B2 | | 2/2004 | Arzouman | |
| 6,966,540 B2 | | 11/2005 | Falk | |
| 7,147,211 B2 | | 12/2006 | Porter | |
| 7,654,036 B2 | | 2/2010 | Shouse | |
| 7,878,482 B2 | | 2/2011 | Hernandez | |
| 8,132,787 B1 | | 3/2012 | Audet | |
| 8,181,936 B2 | | 5/2012 | Walton | |
| 8,348,071 B1 | | 1/2013 | Janlert | |
| 8,398,056 B1 | | 3/2013 | Morrison | |
| 2008/0099745 A1 | | 5/2008 | Arzouman | |

\* cited by examiner

WEIGHT SUPPORTING APPARATUS AND METHOD

CROSS-REFERENCE TO RELATED APPLICATION

This application is a continuation-in-part of co-pending U.S. patent application Ser. No. 14/195,469, filed Mar. 3, 2014, which is a continuation-in-part and claims priority from co-pending U.S. patent application Ser. No. 13/684,378, filed on Nov. 23, 2012.

FIELD OF THE INVENTION

The invention relates to a weight supporting apparatus. More particularly, the invention relates to a weight supporting apparatus, adjustable in height, usable in automotive applications.

BACKGROUND

With many modern automobiles, especially high performance makes such as Porsche, only a limited amount of space exists under the chassis of the automobile whereby a lifting device may be applied. In many cases, due to this limited space, and once the automobile has been lifted, it is not possible to place jack stands, aka "axle stands" or "safety stands," under the chassis because that limited space to receive the jack stand, i.e. the jacking point, is now being occupied by a lifting device. Often, the lifting device is a hydraulic floor jack, which occupies the jacking point space to a degree that there is no room left for the proper placement of a jack stand. These limited spaces to receive a jack stand have been designated by the factory, and supporting the automobile with jack stands outside of these designated spaces presents hazards to the vehicle as well as the person working under or around the vehicle.

What is needed is a weight supporting apparatus that is easily locatable under a weight to be supported. What is also needed is a weight supporting apparatus, adjustable in height, to fit a given application. Additionally, what is needed is a method to use a weight supporting apparatus to support a weight with limited clearance that is adjustable in height. What is also needed is a weight supporting device that may be substantially disassembled for convenient storage.

SUMMARY

According to embodiments of the present invention, a weight supporting apparatus is provided that is easily locatable under an object, e.g., an automobile that is to be supported. Additionally, the weight supporting apparatus is adjustable to fit a given application. A method is also described for using an adjustable weight supporting apparatus to support an object, e.g., an automobile, with limited clearance. Furthermore, the weight supporting apparatus can be a weight supporting device that may be substantially disassembled for convenient storage.

According to an embodiment of the present invention, an adjustable weight supporting apparatus is provided with an object support member, an adapter, and a leg. The support member may include an elongated portion for supporting an object. The adapter may be securable on the support member to receive the object. The leg may include a first end and a second end. The first end is insertable into the support member to a selectable length. The second end may include a foot. The second end is extendable to engage a support surface with the foot. The support member is locatable adjacent to a lifting device.

In another aspect, the leg may include a cap at the corner to strengthen and increase clearance of the apparatus.

In another aspect, the leg may include a channel and wherein a pin is locatable in the channel to selectively fix the length of insertion for the leg into the support member.

In another aspect, the first end of the leg may include a lock channel to align with a lock hole included on the support member. A pin may be insertable through the lock hole and the lock channel to selectively fix the length of the first end of the leg in the support member.

In another aspect, the leg may include a gusset located between the first end and the second end.

In another aspect, the support member may include a plurality of adapters configured to interface with a plurality of objects. The support member may be rotatable to position one of the plurality of adapters to engage at least one of the plurality of objects, respectively.

In another aspect, the adapter is removably attachable to the support member. The support member may further include a port to operatively receive the adapter.

In another aspect, a spacer may be locatable between the adapter and the port of the support member to adjust a height at which the adapter receives the object.

In another aspect, the foot may include a traction surface to interface with a support surface.

According to an embodiment of the present invention, an adjustable weight supporting apparatus may be provided having a support member, a leg, and an adapter. The support member may support an object. The support member may include a locking hole. The leg may include a first end and a second end. The first end may include a locking channel. The first end of the leg may be insertable into the support member to a length selectable by aligning the locking channel with the locking hole. The length may be temporarily fixable by passing a pin through the locking hole and the locking channel. The second end may extend downwardly to a supporting surface. An adapter may be temporarily securable on the support member to receive the object. The adapter may be operatively receivable by a port of the support member. The support member is receivable by a lifting device.

In another aspect, the support member may include an inner surface and an outer surface, a friction resistant material being applied to the inner surface.

In another aspect, the friction resistant material is additionally applied to at least part of the first end of the leg.

In another aspect, a spacer is locatable between the port of the support member and the adapter to adjust a height at which the adapter engages the object. A bottom surface of the support member may include a jack adapter to receive the lifting device.

In another aspect, the second end of the leg is adjustably received by a base support member. The base support member engages the leg second end. A height apparatus is configurable by temporarily fixing the leg to the base support member at a desired length of insertion.

In another aspect, the leg may include a gusset between the first end and the second end.

According to an embodiment of the present invention, a method is provided for adjustably supporting an object using a weight supporting apparatus. The weight supporting apparatus may include an adapter, a leg, and a support member for supporting the object. The method may include (a) locating the support member adjacent to the object to receive the object and a lifting device. The method may additionally include (b) engaging the support member by the lifting device to apply a lifting force from the lifting device to the support member. Also, the method may include (c) engaging the object by the support member to apply the lifting force from the support member to the object, the object being receivable by the support member using the adapter. The method may include (d) engaging the support member with a first end of the leg and temporarily fixing the leg to the support member. The method may include (e) positioning a second end of the leg into the base support member. Furthermore, the method may include (f) removing the lifting device by ceasing to apply the lifting force.

In another aspect, step (d) of the method may further include inserting a first end of the leg into the support member to a selectable length and temporarily fixing the leg to the support member.

In another aspect, step (d) of the method may further include locating the leg below the support member to receive and support the support member.

In another aspect, the first end of the leg may include a lock channel to align with a lock hole included on the support member. In this aspect, step (d) of the method may further include (h) inserting a pin through the lock hole and the lock channel to temporarily fix a length of the first end of the leg in the support member.

In another aspect, the support member may include a plurality of selectable adapters. In this aspect, prior to step (a), the method may include (i) selecting the adapter form the plurality of adapters that is compatible with the object.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention will now be described in detail with reference to embodiments thereof as illustrated in the accompanying drawings. In the following description, an adjustable weight supporting apparatus will be discussed. Those of skill in the art will appreciate alternative labeling of the adjustable weight supporting apparatus as a weight supporting apparatus, jack stand, apparatus, device, the invention, or other similar names. Skilled readers should not view the inclusion of any alternative labels as limiting in any way.

Additionally, the following disclosure may be described in the context of lifting an automobile to perform repairs and include examples related to the same. This context of disclosure has been chosen to clearly illustrate an embodiment of the present invention. However, skilled artisans will appreciate additional applications for the present invention, which may be used outside of the automotive context. Other embodiments may include virtually any scenario where a weight is supported. As such, the present invention should not be limited to applications of supporting the weight of an automobile.

Figure 1:
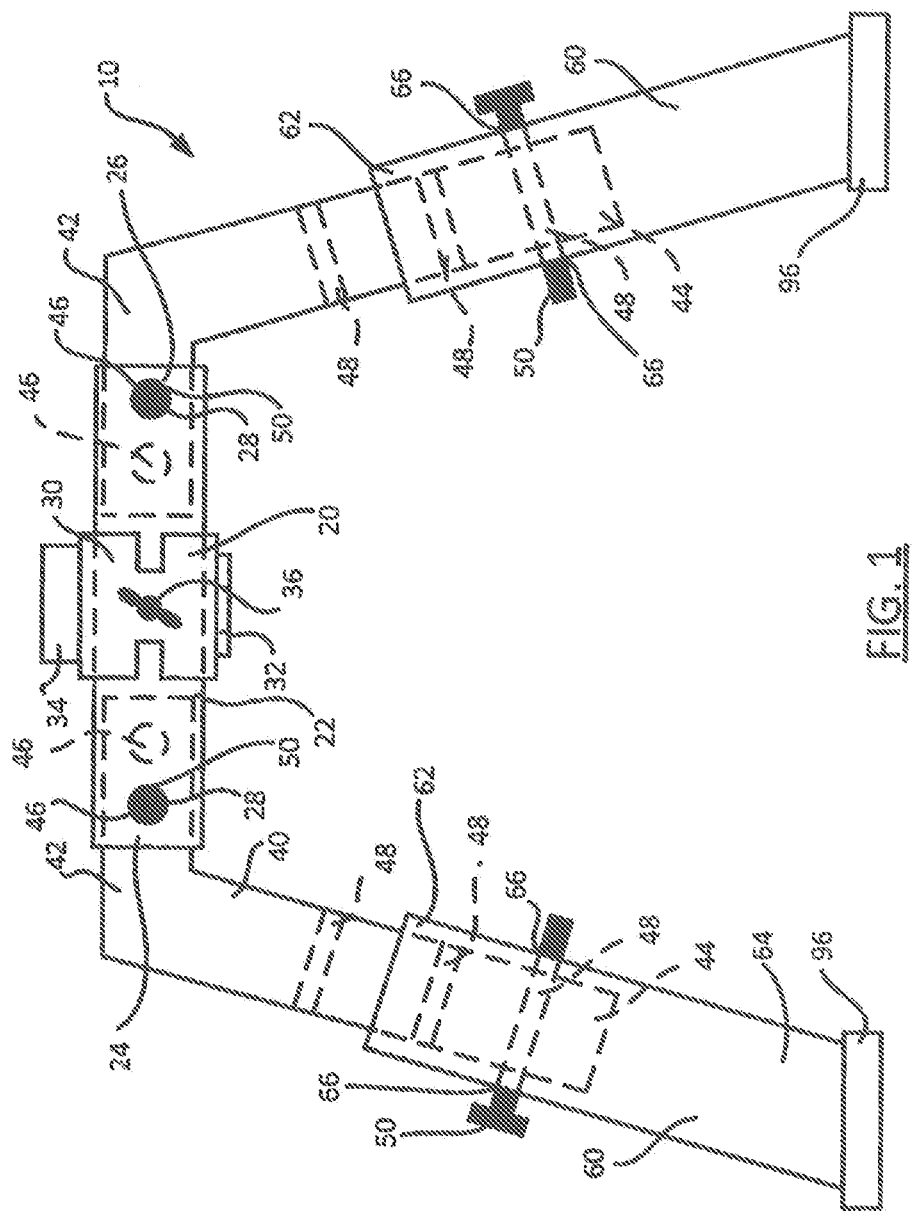
FIG. 1 is a front elevation view of a weight supporting apparatus, according to an embodiment of the present invention.

Referring now to FIG. 1, the weight supporting apparatus 10 will now be discussed. Generally, the apparatus 10 may include a support member 20, legs 40, and a base support member 60. The support member 20 may include a cuff 30 and an elongated portion 22. The base support member 60 may include a foot 96. A leg 40 may be inserted into the support member 20 and/or the base support member 60 to a securable length, which can be temporarily fixed. In a method of using the apparatus 10, lifting force from a lifting device may be transferred through the support member 20 to lift the weight of an object, such as an automobile. The support member 20 may then be configured in a temporarily fixed position using the legs 40 and base support member 60.

Figure 3:
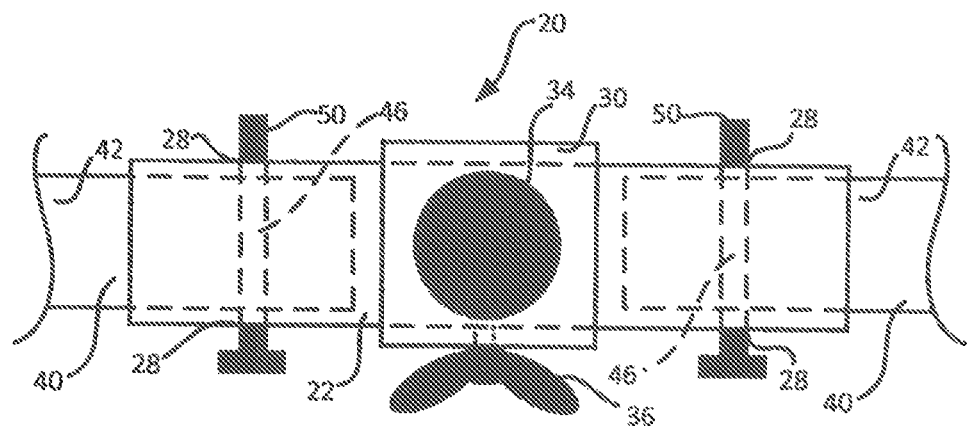
FIG. 3 is a top plan view of the support member receiving legs, according to an embodiment of the present invention.
Figure 4:
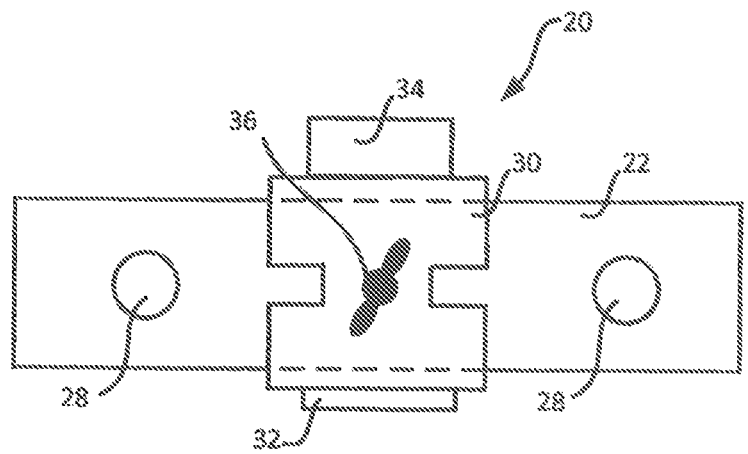
FIG. 4 is a front elevation view of the support member, according to an embodiment of the present invention.
Figure 5:
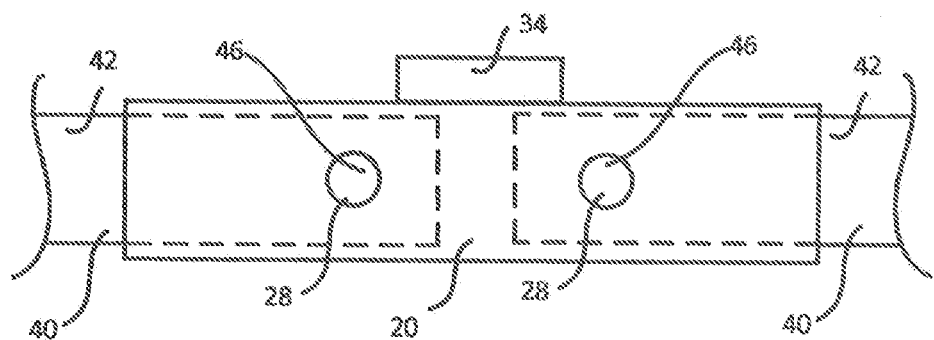
FIG. 5 is a front elevation view of the support member receiving legs, according to an alternative embodiment of the present invention.

Referring now to FIGS. 1 and 3-4, the support member 20 will now be discussed in greater detail. The support member 20 may be positioned below a weight to be supported. Using a lifting device, the support member 20 may be lifted to contact the object to be supported. After the support member 20 and the object have been lifted to a desired height, legs 40 may be added to the support member 20 to support the weight of the object. The support member 20 may be constructed of strong materials to support a large amount of weight, such as steel, aluminum, or other high strength materials. Alternatively, the support member 20 may made with other materials of varying strength characteristic as applications of the present invention may vary.

The support member 20 may include a top surface and a bottom surface. The top surface may interface with a weight to be lifted and/or supported. The bottom surface may interface with a lifting device, which may provide lifting force to the support member 20. The lifting force may be communicated from the lifting device, through the support member 20, and to the object to be lifted and/or supported. The support member 20 may include sides, which may communicate the lifting force from the bottom of the support member 20 to the top of the support member 20.

In one configuration, without limitation, the support member 20 may be elongated square or rectangular shaped. However, skilled artisans will appreciate additional shapes capable of supporting a weight, and should not view the present invention as limited to solely square or rectangular configurations. The length of the support member 20 may be sufficiently long to accommodate one or more legs 40. In one embodiment, the support member 20 may be configured to receive two legs 40. Each leg 40 may be inserted into one of the ends of the support member 20 to a selectable length. As will be discussed in greater detail later in this disclosure, the legs 40 may be temporarily fixed into place within the support member 20.

More specifically, in one embodiment, a support member 20 constructed of steel and/or aluminum may have a substantially flat top and bottom surface, which may be approximately equal width. Two side portions may extend upward from the edges of the bottom portion at an approximately orthogonal angle, to the top portion such to support the weight of the object located above the top portion. The top, bottom, and side portions may form a rectangular box with a substantially open interior. The sides of the box may be substantially open as well. The box may be extended lengthwise from a first end 24 to a second end 26, with a length sufficient to receive a leg 40 in both the first end 24 and the second end 26 of the support member 20 at varying lengths. To receive the legs 40, the interior dimensions of the support member 20 may be more than the exterior dimensions of the leg 40, such that the leg 40 may fit into the support member 20. The clearance between the interior dimensions of the support member 20 and the exterior dimensions of the leg 40 may be small, such to provide a substantially solid and strong fit with minimal motion or play of the leg 40 when inserted into the support member 20. In some embodiments, the legs 40 may be inserted into the support member 20 to a predetermined length that is set during manufacturing. In other embodiments, the legs 40 can be inserted into the support member 20 to any of a plurality of selectable lengths (e.g., 2, 3, 4, 5, 6, or more selectable lengths each of which differs from the other selectable lengths) using a pin that may be passed through a lock hole of the support member and a lock channel of each leg 40 to fix each leg in place.

In additional embodiments, the support member 20 may have multiple portions extending from a point, which may be approximately centrally located. In this configuration, the support member 20 may receive a plurality of legs 40 from one or more directions. For example, a support member 20 may have three elongated portions 22 extending from a center point, which may receive a leg 40 in each elongated portion 22. In another example, a support member 20 may include five elongated portions 22 extending from a center point. In this example, three legs 40 may be inserted into three of the five elongated portions 22, providing flexibility in the working space provided under the weight supporting apparatus 10. Skilled artisans will appreciate that these examples are provided without limitation.

The support member 20 may include multiple components, such as an elongated portion 22. In one embodiment, the support member 20 can include a cuff 30. The elongated portion 22 of the support member 20 may extend lengthwise, and may have a substantially hollow interior. The elongated portion 22 may receive the legs 40, as discussed above. For example, the inner dimensions of the elongated portion 22 may be larger than the outer dimensions of a leg, such that the leg 40 may be inserted into the elongated portion 22 of the support member 20 to a variable length.

The cuff 30 may be designed with a similar shape as the elongated portion 22, but with slightly larger dimensions. The cuff 30 may have a substantially hollow interior. For example, the inner dimensions of the cuff 30 may be larger than the outer dimensions of the elongated portion 22 to permit the elongated portion 22 to be received by the cuff 30. The cuff 30 may then be slidably positioned along the length of the elongated portion 22. The cuff 30 may include a compression member 36, e.g., a thumbscrew, to temporarily fix its location in a desired position on the length of the elongated portion 22. For example, a thumbscrew 36 may be passed into a threaded hole on the cuff 30. The compression member 36 may be loosened to allow the cuff 30 to be moved along the elongated portion 22. Conversely, the compression member 36 may be tightened to reduce or substantially eliminate movement along the elongated portion 22. In an exemplary embodiment, the compression member 36 does not penetrate into the support member 20 but rather is tightened down in contact against the support member to hold the cuff 30 in a temporarily fixed position.

The cuff 30 can be used to allow the legs 40 to be inserted into the support member 20 in limited clearance (or tight) spaces, for example, under the vehicle, by sliding the support member through the cuff. The support member 20 can be slidably pushed through the cuff 30 in a direction away from the limited clearance space under the automobile. The legs 40 can be inserted into the support member 20 next or proximal to the limited clearance space under the automobile. The support member 20 can then be positioned in a desired position under the automobile by the user. The support member 20 can be slidably pushed through the cuff 30 while the cuff is positioned under the weight of the automobile. The cuff 30 can include slots to allow the cuffs edges to extend beyond one or more protruding ends of each attachment pin. The slots of the cuff 30 permit the support member 20 to be easily adjusted into a desired position.

The cuff 30 may receive and substantially encircle the elongated portion 22. Similarly, the elongated portion 22 may receive and substantially encircle one or more leg 40. In this embodiment, lifting force may be provided from the lifting device to the cuff 30 which may be transferred to the object being lifted. Once the object has been lifted to the desired height, the legs 40 may be inserted to support the object without lifting force being provided by the lifting device. While being supported by the apparatus 10, the weight of the object may be translated from the cuff 30 to the elongated portion 22 of the support member 20, and further transferred to the legs 40. The remaining operation of the weight supporting apparatus 10 will be discussed in greater detail below.

A pad 34 may be included between the top surface of the support member 20 and the bottom of the object being lifted and/or supported. The pad 34 may be attached to the top of the support member 20. The pad 34 may be removable or permanently fixed. The pad 34 may be made of virtually any material capable of supporting a desired object, such as, for example, a rubber, composite, metallic, antioxidants, bonding materials, or other material. The pad 34 may be shaped to fit a surface of an object where it will be received. For example, an automobile may include an indented and/or protruding surface to receive a hydraulic and/or emergency jack. The pad 34 may be shaped to receive this surface, which may increase security and stability of the contact between the weight supporting apparatus 10 and the object being supported. The pad 34 may be interchangeable with additional pads 34 constructed from other materials and/or shapes. The pad 34 may also decrease the impacting force between the apparatus 10 and the object being supported while the support member 20 is lifted into place.

A jack adapter 32 may be included between the bottom surface of the support member 20 and the top of the object lifting device. The jack adapter 32 may be attached to the bottom of the support member 20. The jack adapter 32 may be removable or permanently fixed. The jack adapter 32 may be made of virtually any material capable of supporting the support member 20 and a desired object, such as, for example, a rubber, composite, metallic, antioxidants, bonding materials, or other material. The jack adapter 32 may be shaped to fit a surface of the lifting device. For example, a hydraulic jack may include a cupped surface to contact an object being lifted. The jack adapter 32 may be shaped to be received by this surface, which may increase security and stability of the contact between the lifting device and the weight supporting apparatus 10. The jack adapter 32 may be interchangeable with additional jack adapters 32 constructed of other materials and/or shapes.

In an embodiment wherein the support member 20 includes an elongated portion 22 and a cuff 30, the pad 34 and/or jack adapter 32 may be included on the cuff 30. The cuff 30 may be positioned along the elongated portion 22 to be received by a desired point of the object being supported. For example, the cuff 30 may be slidably located under an automobile to the contact point designated for an emergency jack. Once the cuff 30 is set to the desired location, it may be temporarily fixed along the elongated portion 22 using the compression member 36.

The support member 20 may include a lock hole 28. In one embodiment, the support member 20 may include a plurality of lock holes 28 at its first and second ends 24, 26. For example, a pair of lock holes 28 may be included at the first end 24 of the support member 20. The pair of lock holes 28 may be aligned to allow a pin 50 to pass into a first lock hole of the pair, through the interior space of the support member 20, and out of the second lock hole of the pair. One or more pairs of lock holes 28 may be included each end of the support member 20.

Referring now to FIGS. 1-3 and 5, the legs 40 will now be discussed in greater detail. The legs 40 may be located between the support member 20 and the vertical member 60. The legs 40 may have a first end 42 to interface with the support member 20 and a second end 44 to interface with a vertical member 60. The legs 40 may be temporarily fixed to the support and/or vertical members 20, 60 to transfer weight from the support member 20 to the vertical member 60. For example, weigh may be received by the support member 20 from an object being supported, which may be transferred to and supported by a first end 42 of the legs 40. The weight may then be transferred to and supported by the vertical member 60 through the second end 44 of the legs 40. The vertical member 60 may ultimately transfer the weight to a supporting surface, such as the ground or a shop floor.

The legs 40 may be constructed of a material of sufficient strength to support a desired amount of weight. More specifically, the legs 40 may be constructed using steel, aluminum, composites, and/or other materials. The legs 40 may be solid or hollow, and may be constructed as one monolithic piece or formed from multiple welded pieces. In one embodiment, a leg 40 may be fixedly attached to a vertical member 60. As discussed above, the legs 40 may be shaped similarly to the support member 20 in which the leg 40 may be inserted, having outer dimensions that are smaller than the inner dimensions of the support member 20. Similarly, the legs 40 may be shaped similarly to a vertical member 60 in which the leg 40 may be inserted, having outer dimensions that are smaller than the inner dimensions of the vertical member 60. The first end 42 and the second end 44 of the legs 40 may have similar or dissimilar shapes.

The legs 40 may include one or more lock channels 46 at its first end 42. The lock channels 46 may pass substantially through the interior of the leg 40. After being inserted into the support member 20, the lock channels 46 may be aligned with the lock hole 28 located on the support member 20. A pin 50 or other device may be passed through the lock holes 28 on the support member 20 and one or more lock channels 46 included by the first end 42 of the leg 40 to temporarily fix the leg 40 within the support member 20. The leg 40 may be unfixed from the support member 20 by removing the pin 50 from the lock holes 28 and lock channel 46.

Similarly, the legs 40 may include one or more adjusting channels 48 at its second end 44. The adjusting channels 48 may pass substantially through the interior of the leg. After being inserted into the vertical member 60, the adjusting channels 48 may be aligned with adjusting holes 66 located on the vertical member 60. A pin 50 or other device may be passed through the adjusting holes 66 on the vertical member 60 and one or more adjusting channels 48 included by the second end 44 of the leg 40 to temporarily fix the leg 40 within the vertical member 60. The leg 40 may be unfixed from the vertical member 60 by removing the pin 50 from the adjusting holes 66 and adjusting channel 48.

In one embodiment, the leg 40 may include a plurality of lock channels 46 and/or adjusting channels 48. The dimensions of the weight supporting apparatus 10 may be adjusted by selecting a channel of desired length to pass the pin 50 through. For example, a wider work space under the apparatus 10 may be created under an automobile by passing the pin 50 through the lock holes 28 and lock channel 46 that aligns with the lock holes 28 at a small insertion length. Conversely, a more tightly contained apparatus 10, which may provide additional workspace outside of the footprint of the apparatus 10, may be created by passing the pin 50 through the lock holes 28 and lock channel 46 that aligns with the lock holes 28 at a large insertion length.

As an additional example, a higher work space under the apparatus 10 may be created under an automobile by passing the pin 50 through the adjusting holes 66 and adjusting channel 48 that aligns with the adjusting holes 66 at a small insertion length. Conversely, a lower workspace may be created by passing the pin 50 through the adjusting holes 66 and adjusting channel 48 that aligns with the adjusting holes 66 at a large insertion length.

In an embodiment, the legs 40 may include a leg support bar. The leg support bar may be located adjacent to the legs 40 to reduce a risk of the legs 40 spreading outward. The leg support bar may be temporarily fixed to a leg 40 via channels and pins, an at least partially encircling cuff, or other technique. Skilled artisans will appreciate various supportive configurations for the leg support bar after having the benefit of this disclosure.

Figure 2:
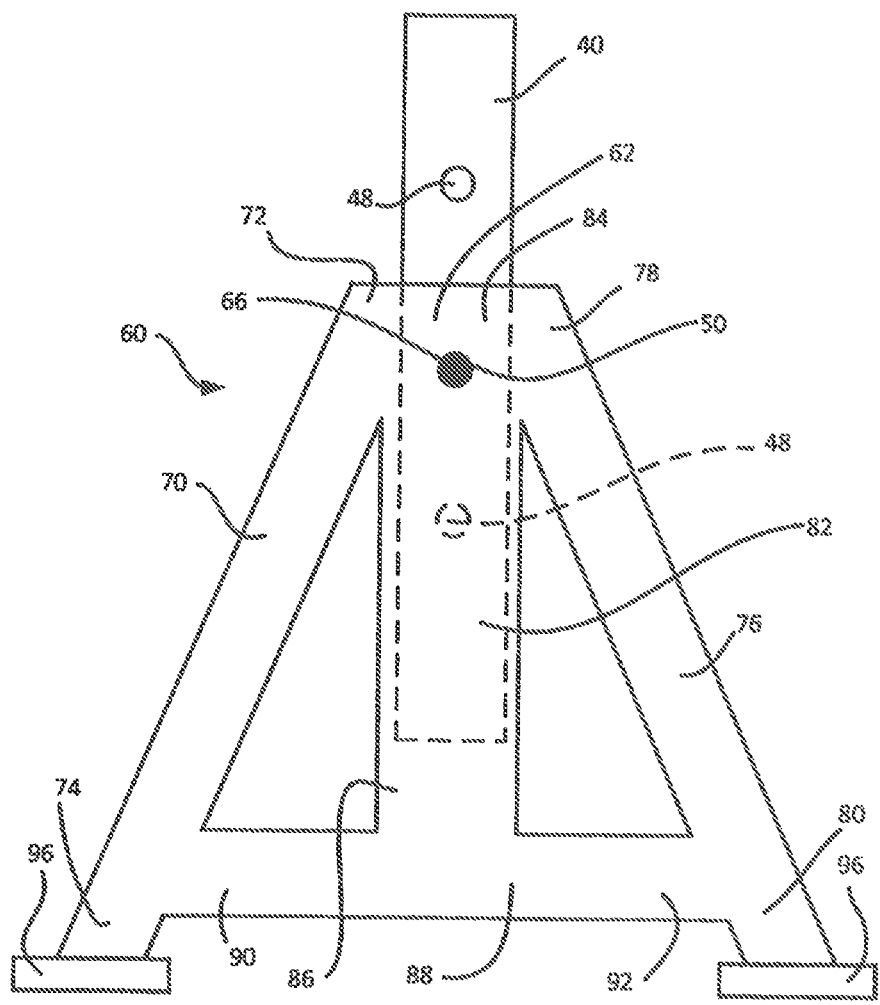
FIG. 2 is a side elevation view of a base support member, according to an embodiment of the present invention.
Figure 6:
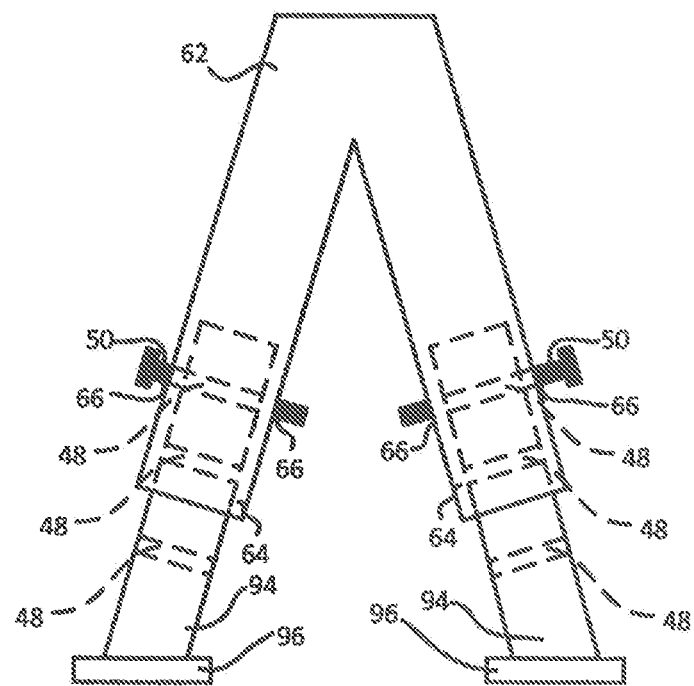
FIG. 6 is a side elevation of a base support member, according to an alternative embodiment of the present invention.
Figure 8:
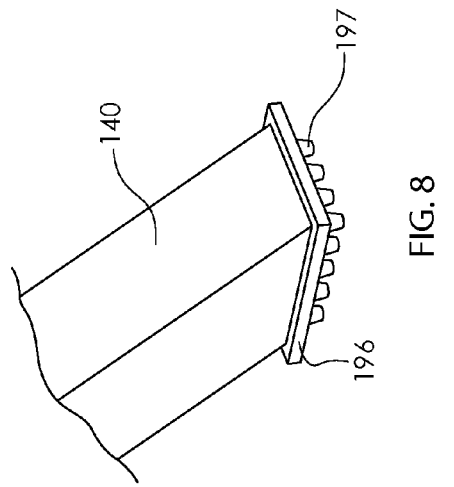
FIG. 8 is a perspective view of a leg and optional foot, according to an embodiment of the present invention.

Referring now to FIGS. 1-2 and 6, the base support member 60 will now be discussed in greater detail. The base support member 60 may include a top end 62 and a bottom end 64. A leg 40 may be received by the top end 62 of the base support member 60. A foot 96 may optionally be included at the bottom end 64 of the base support member 60, which may interface between the base support member 60 and a supporting surface, such as the ground or a shop floor. The foot may be flat, beveled, rounded, and/or otherwise configured to interface with the supporting surface. For example, and without limitation, the foot may be shaped accordingly as not to mar a shop floor or garage work area.

The base support member 60 may be positioned adjacent to a supporting surface, such as the ground or a shop floor. The base support member 60 may be constructed of strong materials to support a large amount of weight, such as steel, aluminum, and/or other high strength materials. Alternatively, the base support member 60 may be made using other materials, with varying strength characteristic, as applications of the present invention may vary.

In one configuration, without limitation, the base support member 60 may include one or more elongated square or rectangular shaped pieces. However, skilled artisans will appreciate additional shapes capable of supporting a weight, and should not view the present invention as limited to solely configuration with square or rectangular components. The elongated length of the base support member 60 may be sufficiently long to accommodate one or more legs 40. In one embodiment, the base support member 60 may be configured to receive a leg 40. The leg 40 may be inserted into the top end of the base support member 60 to a selectable depth. The legs 40 may be temporarily fixed into place within the base support member 60.

To receive the legs 40, the interior dimensions of the base support member 60 may be more than the exterior dimensions of the leg, such that the leg 40 may fit into the base support member 60. The clearance between the interior dimensions of the base support member 60 and the exterior dimensions of the leg 40 may be small, such to provide a substantially solid and strong fit with minimal motion or play of the leg 40 when inserted into the base support member 60.

The base support member 60 may include an adjusting hole 66. In one embodiment, the base support member 60 may include a plurality of adjusting holes 66 at its top. For example, a pair of adjusting holes 66 may be included at the top end 62 of the base support member 60. The pair of adjusting holes 66 may be aligned to allow a pin 50 to pass into a first adjusting hole of the pair, through the interior space of the base support member 60, and out of the second adjusting hole of the pair. One or more pairs of adjusting holes 66 may be included by the base support member 60.

Referring now to FIG. 2, along with the additional figures, an embodiment of the base support member 60 will now be discussed as an example. Skilled artisans will appreciate additional embodiments and configurations of the base support member 60, and should not read any limitation into the following example. The base support member 60 may be constructed from multiple portions, which may be welded or otherwise connected to one another. More specifically, the base support member 60 may include a first angled portion 70, a second angled portion 76, and a vertical portion 82, each with a respective top end 72, 78, 84 and bottom end 74, 80, 86. The base support member 60 may also include a support portion 88, which may extend from the first angled portion 70 at a first end 90 to the second angled portion 76 at a second end 92. The first and second angled portions 70, 76, may include a foot 96 at their respective bottom ends 74, 80. The bottom end 86 of the vertical portion 82 may be received by and attached to the support portion 88 at an approximately orthogonal angle.

Referring now to FIG. 6, along with the additional figures, an additional embodiment of the base support member 60 will now be discussed. In the interest of clarity, reception of the legs 40 discussed above has been omitted form the drawing. In this embodiment, the base support member 60 may receive a plurality of lower legs 94 at its bottom end 64. The lower legs 94 may be constructed and configured similarly to the legs 40 discussed above. However, conversely to the legs 40 discussed above, the lower legs 94 may be received by and extend outward from the bottom end 64 of base support member 60. Similar to the legs 40 discussed above, the lower legs 94 may include one or more adjusting channels 48, which may be aligned with adjusting holes 66 to selectively and temporarily fix a position of the lower legs 94 within the base support member 60. The height at which the weight supporting apparatus 10 is configured may be adjusted by passing a pin 50 through a desired adjusting channel 48 that corresponds with a desired insertion length of the lower leg 94 within the base support member 60. A foot 96 may optionally be attached to the bottom end of the lower leg 94.

In operation, the adjustable weight supporting apparatus 10 may be used to support an object by distributing its weight to a supporting surface, such as the ground. The method may first include locating the cuff 30 adjacent to the weight. The cuff 30 may at least partially encircle the elongated portion 22 allowing it to be slidably positioned to receive the weight of the object. The cuff 30 may also be positioned to receive the lifting device. The location of the cuff 30 may be selectively and temporarily fixable to the elongated portion 22, for example, by tightening a compression member 36 such as a thumb screw.

The lifting device may engage the support member 20 to apply a lifting force from the lifting device to the support member 20. The support member 20 may then engage the object to apply the lifting force from the support member 20 to the weight of the object. Prior to being engaged by the support member 20, the object may support its own weight.

Once the object has been lifted, the first end 42 of a leg 40 may be inserted into the support member 20 to a desired depth. The leg 40 may then be temporarily fixed at the desired depth within the support member 20. More specifically, a pin 50 may be passed through the lock hole 28 of the support member 20 and the lock channel 46 of the leg 40 to fix the leg 40 in place. This step may be repeated for each leg 40 being inserted into the support member 20.

The second end 44 of the leg 40 may be inserted into the base support member 60 to a selectable length. The leg 40 may then be temporarily fixed at the desired length within the base support member 60. More specifically, a pin 50 may be passed through the adjusting hole 66 of the base support member 60 and the adjusting channel 48 of the leg 40 to fix the leg 40 in place. This step may be repeated for each leg 40 being inserted into a base support member 60 Skilled artisans will appreciate that the leg 40 may be secured in the support member 20 and base support member 60 in any order or simultaneously.

Once the desired number of legs 40 have been fixed in the support member 20 and base support members 60, the lifting device may be removed from under the support member 20. The weight that was previously supported by the lifting device through the support member 20 may now be supported solely by the support member 20, which is already in contact with the object of weight being supported. The weight may be transferred from the support member 20 to the legs 40, which may further transfer the weight to the base support members 60. The base support members 60 may be in contact with a supporting surface, such as the ground or a shop floor, and may transfer the weigh to the supporting surface. If the base support member 60 includes one or more foot 96, the weight may be transferred from the base support member 60, through the foot 96, to the supporting surface.

To remove the weight supporting device, the support member 20 should be engaged with the lifting device such that the lifting device is supporting the weight of the object. Once the legs 40 and base support members 60 are not supporting any weight, they may be unfixed from the apparatus 10. More specifically, the pin 50 may be removed from the adjusting holes 66 of the base support member 60 and the adjusting channels 48 of the legs 40 to remove the base support member 60. Also, the pin 50 may be removed from the lock holes 28 of the support member 20 and the lock channel 46 of the leg 40 to remove the leg 40 from the support member 20. The lifting device may then be lowered, allowing the object to support its own weight. The support member 20, which is no longer supporting any weight, may then be removed from the lifting device.

Referring to FIGS. 7-11, an additional embodiment of the present invention will now be discussed. The weight supporting apparatus may include an adapter 138. The adapter 138 may include various shapes and configurations which may be compatible with objects to be lifted and/or supported. The adapter 138 may be permanently and/or temporarily fixed to the support member 120. For example, the adapter 138 may be permanently welded to the support member 120. As another example, the support member 120 may include one or more ports 137 to operatively receive one of a plurality of configurable adapters 138.

The support member 120 may be configured to receive multiple adapters 138. For example, the support member 120 may include an adapter 138 with one or more of interfaces to be received by the support member 120. In use, an adapter 138 insertable into the support member 120 may be rotated such that the desired side of the adapter 138 is positioned to interface with the object to be supported. After the adapter 138 has been rotated in the desired orientation and temporarily attached to the support member 120, the apparatus may be used to lift the object, after which the legs 140 may be inserted into the support member 120 to support the object.

In one embodiment, the support member 120 may include a port 137. The adapter 138 may include an attachment to be received by the port 137. An interchangeable collection of adapters 138 may be temporarily received by the port 137 to be used to support an object. For example, a first adapter may be configured to be compatible with the first object, such as a BMW, to be lifted and/or supported. After lifting and/or supporting the first object, a user may desire to lift and/or support a second object, such as a Porsche. The adapter that is compatible with the first object may be removed from the port 137 of the support member 120. A different adapter that is compatible with the second object may then be operatively received by the port 137. The user may then lift and/or support the second object using the compatible adapter.

The adapter 138 may be temporarily and/or removably received by the port 137. For example, the attachment of the adapter 138 may be threaded. Additionally, the port 137 of the support member 120 may be threaded. The attachment may then be screwed into the port 137 of the support member 120 to a desired height Skilled artisans will appreciate additional interfaces between the adapter 138 and the support member 120 after having had the benefit of this disclosure.

A spacer may be included by the present invention, which may be located between the support member 120 and the adapter 138. For example, the spacer may be located between the port 137 of the support member 120 and the attachment of the adapter 138. The spacer may advantageously adjust the height at which the adapter 138 may engage the object. Skilled artisans will appreciate that one or more spacers may be used, without limitation.

Still referring to FIGS. 7-11, an additional embodiment of the present invention will now be discussed. The weight supporting apparatus may include a support member 120 and a leg 140. The support member 120 may be substantially trapezoidal. The leg 140 may be constructed as one single member or a composition of more than one attached members.

Figure 7:
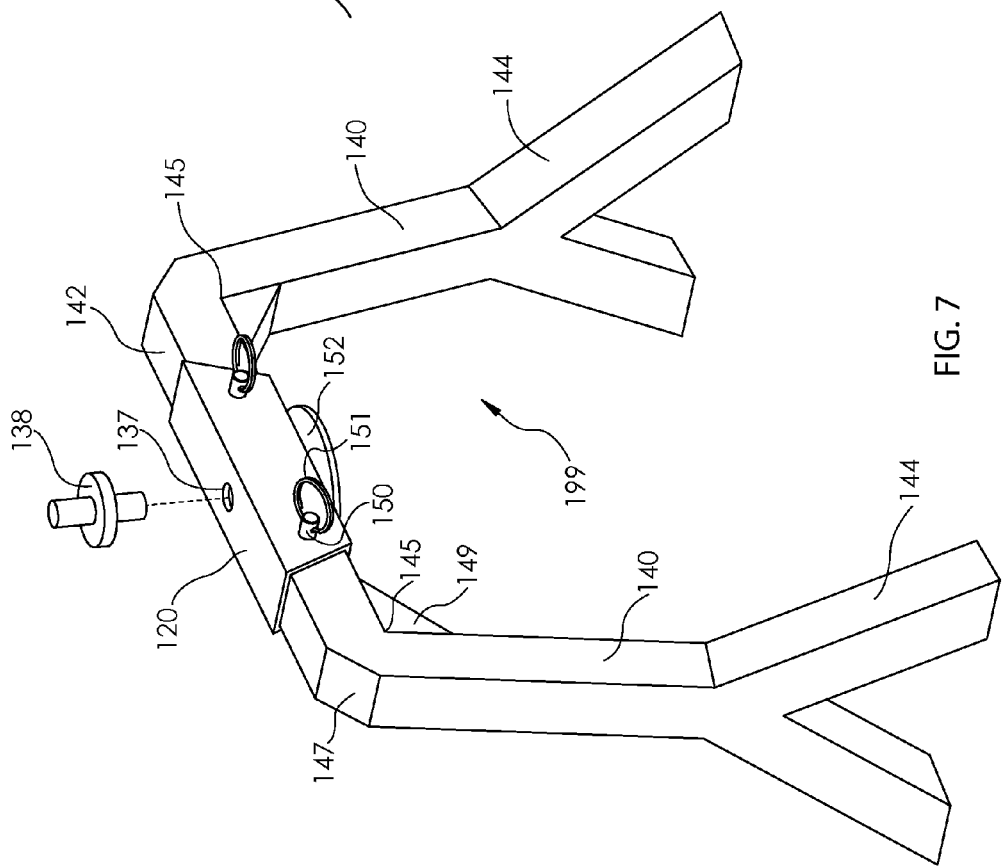
FIG. 7 is a perspective view of a weight supporting apparatus, according to an alternative embodiment of the present invention.

In one embodiment, the leg 140 may have a first end 142 and a second end 144. Where the leg is one single piece, the second end 144 of the leg may extend from a curve in the single member toward a support surface, such as the ground. The second end 144 of the leg 140 may engage the support surface without being received by a vertical member, such as illustrated in FIG. 7. The second end 144 of the leg 140 may have multiple points of contact with the support surface. The multiple points of contact may increase the stability of the contact between the leg 140 and the support surface. In an alternative embodiment, the second end 144 of the leg 140 may be received by a vertical member that interfaces with the support surface. Skilled artisans will appreciate additional configurations, without limitation.

In another embodiment, where the leg includes multiple fixed members, the second end 144 of the leg 140 may extend from a corner 145 at which a member meet toward a support surface, such as the ground. The second end 144 of the leg 140 may engage the support surface without being received by a vertical member, such as illustrated in FIG. 7. In an alternative embodiment, the second end 144 of the leg 140 may be received by a vertical member that interfaces with the support surface Skilled artisans will appreciate additional configurations, without limitation.

As discussed above, the legs 140 may optionally include a first end 142 and a second end 144, which may intersect at a corner 145. The corner 145 may include a cap 147. The cap 147 may be a flat piece of material attached to the intersection of the first end 142 and the second end 144 of the leg 140, without limitation. The cap 147 may also be provided in configurations other than being flat. The cap 147 may be welded to the leg 140. By providing a cap 147, the present invention may advantageously provide a weight supporting apparatus with increased strength and clearance 199.

The leg 140 may also optionally include a gusset 149. The gusset 149 may be located near the intersection of the first end 142 and second end 144 of the leg 140. The gusset 149 may be located externally at the intersection of the first and second ends 142, 144 of the leg 140. Alternatively, the gusset 149 may be located internally with in the leg 140. Additionally, material at the corners 145 may be thickened to increase stability and strength of the leg 140.

Figure 9:
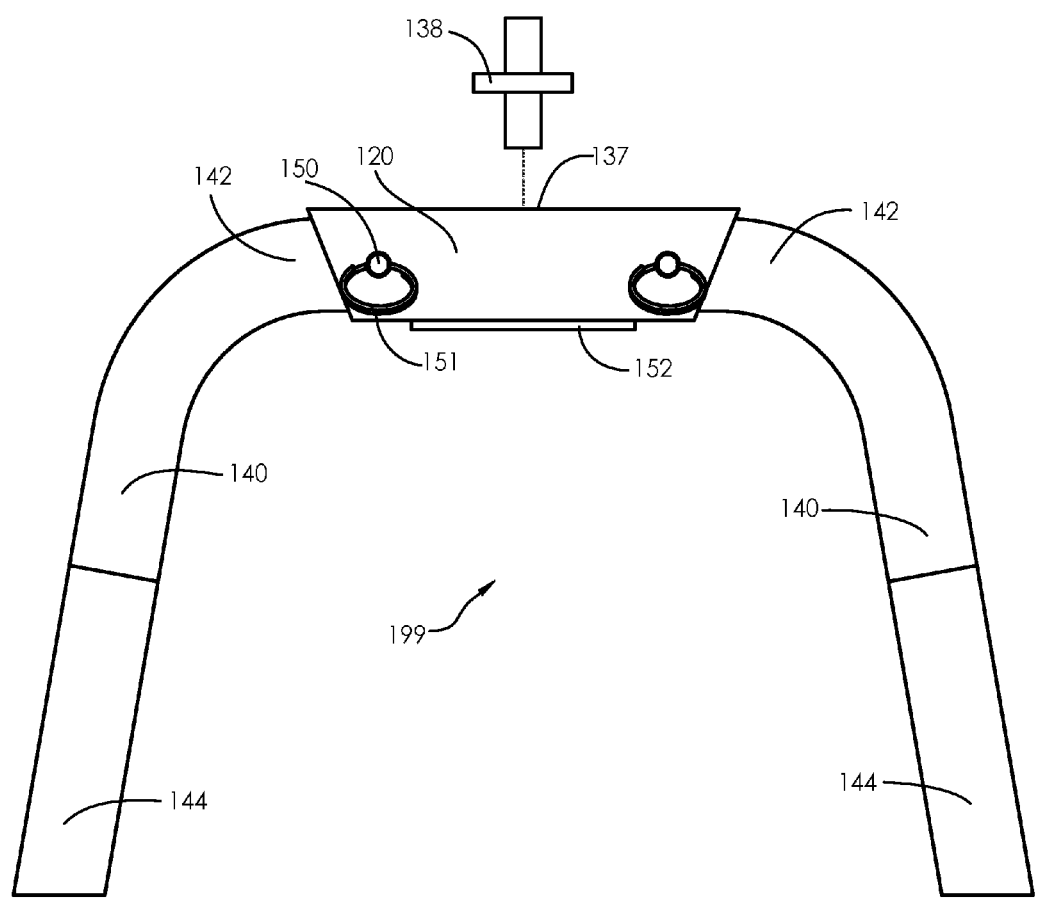
FIG. 9 is a side elevation view of the weigh supporting apparatus, according to an embodiment of the present invention.
Figure 10:
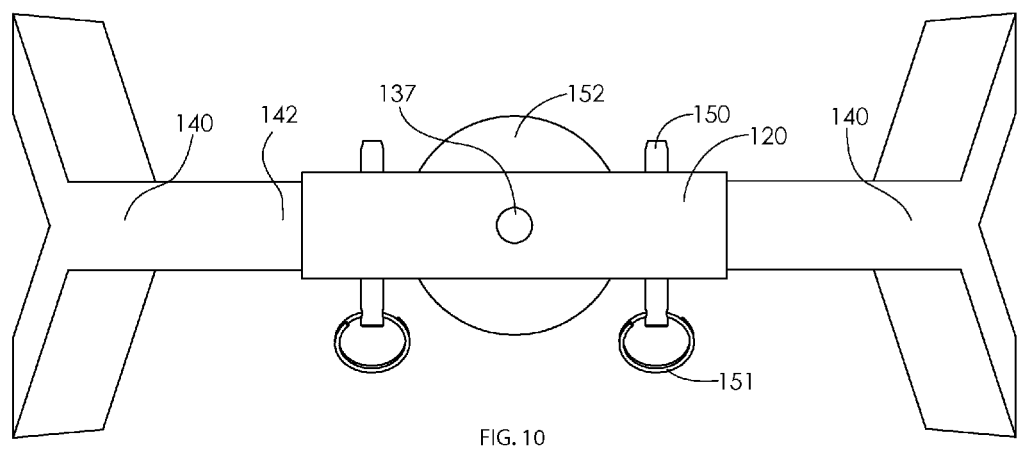
FIG. 10 is a top plan view of the apparatus of FIG. 9.
Figure 11:
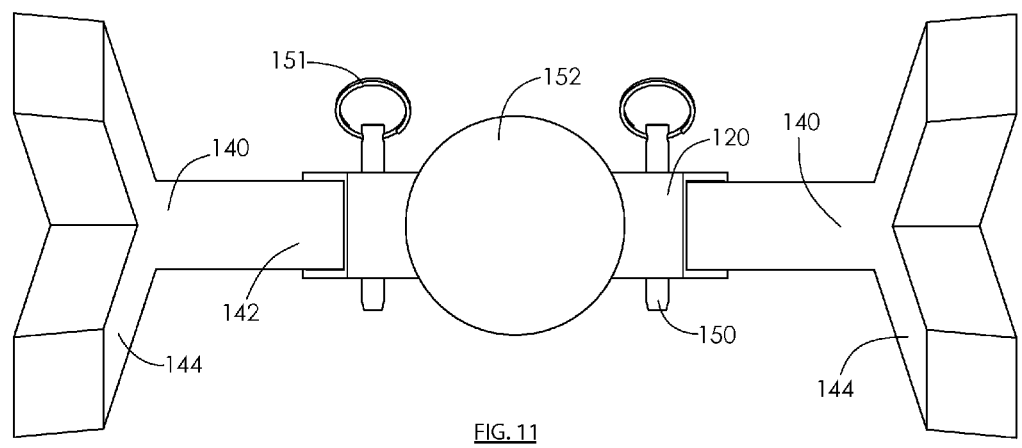
FIG. 11 is a bottom plan view of the apparatus of FIG. 9.

According to an embodiment of the present invention, the leg 140 may be formed as a single piece. The leg 140 may be curved, as illustrated in FIGS. 9-11. The leg may be curved to provide additional clearance between the device and the object being supported. The leg 140 may also be constructed using a variety of materials, for example and without limitation, steel, aluminum, carbon fiber, iron, wood, plastic, composite materials, fiberglass, and other material that would be apparent to a skilled artisan. Each of the components may be solid, hollow, or otherwise constructed. Furthermore, clearance 199 under the device, which may be in addition to the clearance provided between the device and the object being supported, can also be achieved by a curved leg 140, or multi-angled leg 140, as illustrated in FIGS. 7 and 9. This clearance 199 may allow a person to work in the space under the support member 120 and/or legs 140.

Furthermore, additional clearance may be provided above the angled and/or curved portions of the leg 140, outside of and apart from the clearance 199 provided under the device. This additional clearance may accommodate positioning the device on a slanted or uneven surface as to reduce the likelihood of the leg undesirably contacting the underbody of the device or object being lifted. Skilled artisans should appreciate varying amounts and degrees of curving to be included by the present disclosure.

According to an embodiment of the present invention, the leg 140 may optionally include a foot 196. The foot 196 may have various types of bottom surfaces. For example, a foot 196 may optionally have the traction surface 197 located at its bottom. The traction surface 197 may increase friction between the foot 196 and a support surface, such as the ground. An example of the traction surface 197 may include spikes, sand, grooves, or other surface formations that may increase traction. An example of a foot 196 including the traction surface 197 of spikes is provided by FIG. 8, without limitation. Additional types of bottom surfaces may also be provided by the foot 196, such as a roller, a friction reducing surface, or another surface that would be understood by a skilled artisan.

According to an embodiment of the present invention, the support member 120 may have interior and exterior surfaces. The interior surface of the support member 120 may have a nonslip or friction resistant coating applied. Additionally, at least part of the surface of the leg 140, such as at the first end 142 of the leg, may be coated with a nonslip or friction resistance surface. By providing a friction resistant surface coating, the present invention advantageously reduces friction caused by inserting the leg 140 into the support member 120. Additionally, a coating may advantageously reduce corrosion of the various components of the weight supporting apparatus by limiting exposure of the materials of the apparatus to natural elements.

The support member 120 may be provided in an approximately trapezoidal configuration. For example, a top surface of the support member may be longer than its bottom surface. This trapezoidal shape advantageously allows the legs 140 to be inserted into the support member 120 in situations where space is tight. In this embodiment, because of the angled ends of the support member 120, the first end 142 of the leg 140 can approach the support member 120 at an angle, allowing the leg 140 to be attached to the support member 120 where space is limited. The leg 140 may be held by the support member 120 using a pin 150, which may include a ring 151. Additionally, a jack adapter 152 may be located at the bottom surface of the support member 120. The top surface of the support member 120 may be substantially flat. A port 137 may be located at the top surface of the support member 120. The port may be configured to receive one or more adapter 138. Various adapters 138 can be attached easily to the support member 120 by basically dropping one end of the adapter 138 into the port 137.

According to an embodiment of the present invention, the weight supporting apparatus may be designed in an ultra-compact configuration. For example, when the apparatus is disassembled, it may take up minimal space. By providing the weight supporting apparatus in an ultra-compact configuration, the present invention advantageously allows the apparatus to be taken to various events, such as track events, be stored in small spaces, and be transported and/or shipped at reduced cost and inconvenience.

According to an embodiment of the present invention, the weight supporting apparatus may be provided in an emergency version. In this emergency version, interchangeability of parts may be minimized and/or eliminated. For example, and without limitation, the support member may not require interchangeable adapters. To reduce cost and complexity, the support member may include one permanently attached adapter configured to receive a certain type of object. As an example, an emergency version of the apparatus may be included with an automobile from a particular manufacturer. In this embodiment, the emergency version of the apparatus may be configured only to receive vehicles assembled by that manufacturer.

Figure 12:
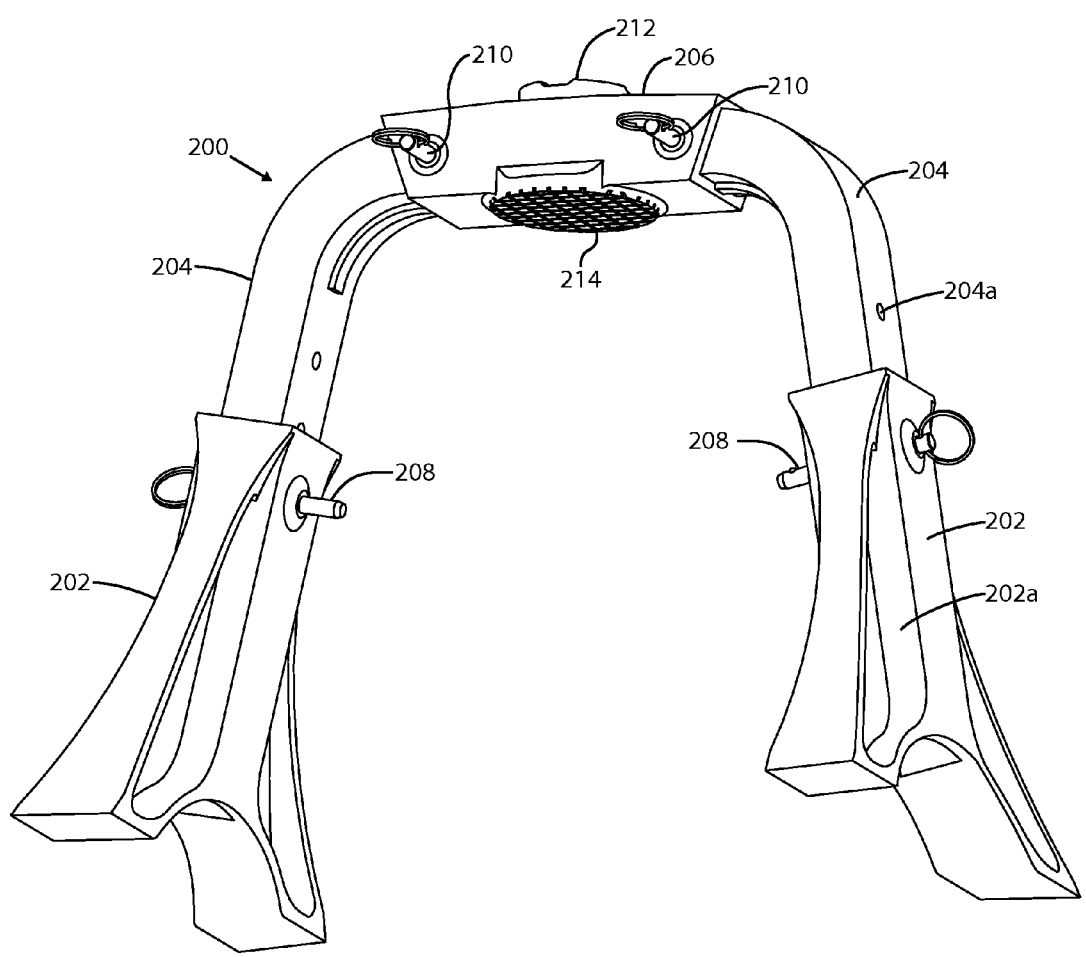
FIG. 12 is a perspective view of an alternate embodiment of the invention.

FIG. 12 shows an alternate embodiment of the invention. The overall shape of the weight supporting device 200 shown in FIG. 12 is trapezoidal. However other shapes are possible such as rectangular. A pair of base support members or bases 202 are used to support the device 200. Mounted telescopically within each base 202 is a curved leg 204. The legs 204 are held in place with each base 202 by pins 208. When the pins 208 are removed from each base 202, each leg 204 can be removed from each base 202. Each leg 204 is connected into each end of a support member 206. A pair of removable pins 210 are used to connect each leg 204 to support member 206. The bottom surface of the support member 206 has an area 214 that is scored that would engage the top surface of a lifting jack or jack adapter. On the top surface of support member 206 is mounted removably a jack adapter 212 that engages the vehicle surface or jack point that is being lifted and will be supported by the invention. Each base 202 may include an open area 202a that reduces the overall weight without reducing the strength of each base 202. Each base 202 is trapezoidally shaped for stability and support strength.

Figure 13:
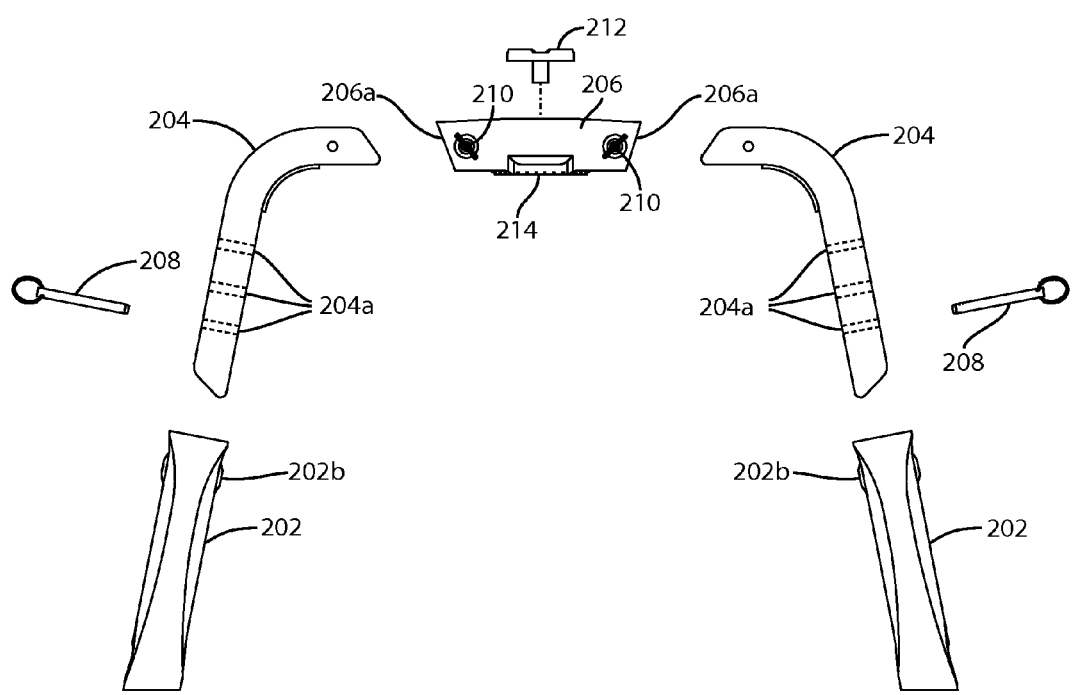
FIG. 13 is a front elevational exploded view of the alternate embodiment shown in FIG. 12.

FIG. 13 shows an exploded view of the alternate embodiment disclosed above in FIG. 12. Each trapezoidal base 202 receives a leg 204 to a selectable length that will be secured in place by pins 208 which firmly attach each leg 204 to each base 202. In addition the support member 206 also receives the upper ends of each leg 204 and is secured in place by pins 210. The ends 206a of the support member 206 are angled relative to the vertical so as to more easily receive the upper end face of each leg 204 during installation and operation of the lifting device making it easier to install or remove the legs 204. Pins 208 in conjunction with holes 204a and base holes 202b can be used to adjust the height of the support above the ground. The jack adapter 212 is removable and can be lifted away from the support member 206.

Figure 14:
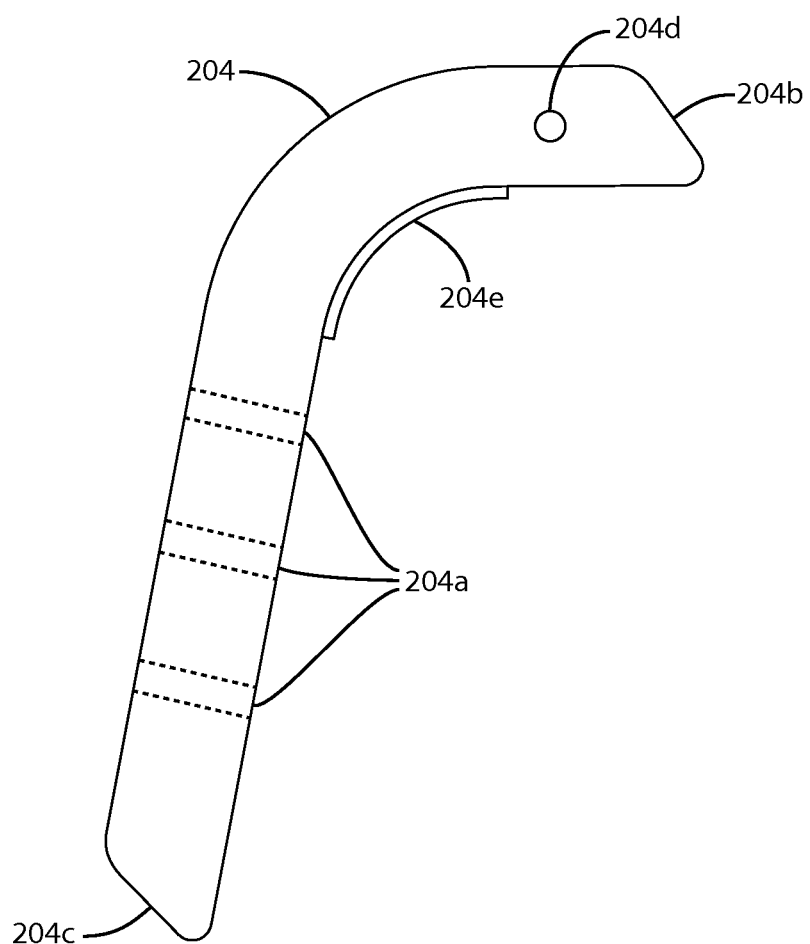
FIG. 14 is a side elevational view of one of the legs used in the alternate embodiment of the invention shown in FIG. 12.

FIG. 14 shows a single leg 204 that connects the base 202 with the support member 206 on each side when the device is in operation. The shape of the leg 204 and the end surfaces of the leg 204b and 204c are important in the operation of the device. The end face 204b and end face 204c are angled relative to the longitudinal axis of each leg in order to more easily be inserted and removed at each end into the support member 206 and the base member 202. Using the present invention is often done with very little space for an operator to jack up a car and support a portion of the car above the ground safely. Certain parts of the car and the ground can interfere with insertion and removal of the legs 204 when the jack stand is being set up or removed. In addition each leg 204 includes apertures 204a and 204d that each receive locking pins described above. Each leg also includes stopper surface 204e. The purpose of the stopper 204e is twofold. The uppermost end of the stopper, when the end of the stopper is flush with the bottom edge of support member 206, allows for the hole 204d in the upper part of the leg 204 to align approximately with the hole 206c in the support member 206. Additionally the bottom end of the stopper 204e prevents the lower part of the leg 206 from telescoping too deeply into the base support member 202 preventing seizing and damage to the components.

Figure 15:
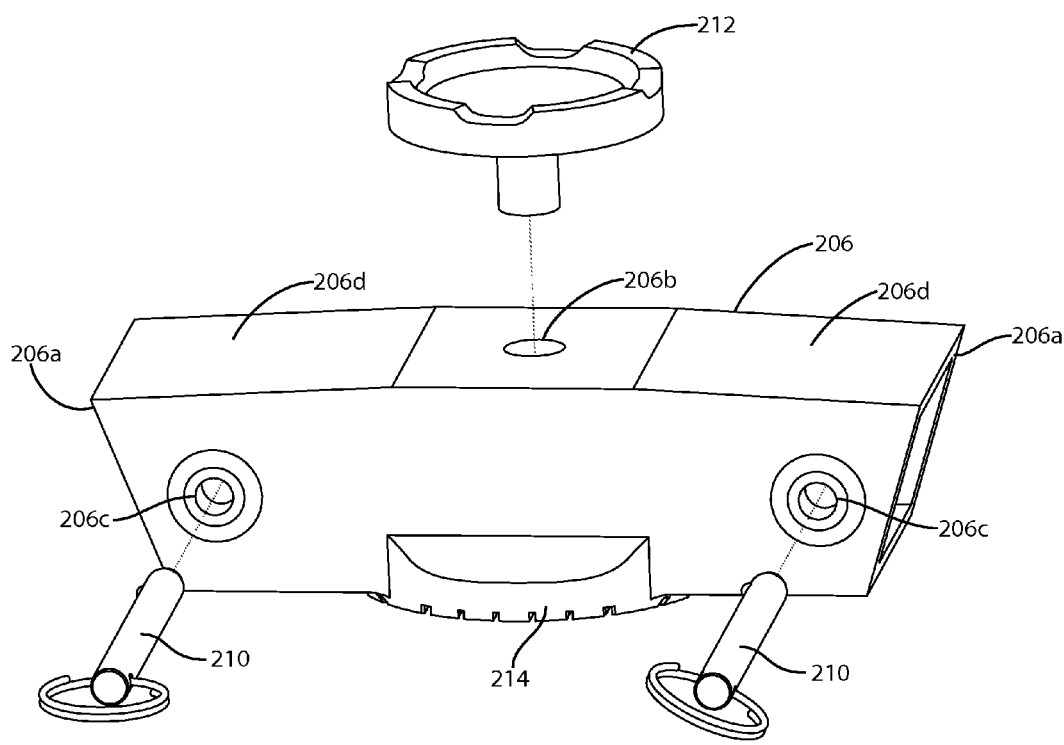
FIG. 15 is a perspective exploded view of the upper support member utilized in the alternate embodiment of the invention shown in FIG. 12.

FIG. 15 shows the support member 206 and the angled end faces 206a. Note also that the top surface of support member 206 is not flat but in fact is tapered away from the center downwardly as shown at 206d. This allows the support member 206 more space for movement during installation and removal of the device. The support member 206 also includes holes 206c that receive the pins 210 to lock the legs 204 in place in operation. A jack adapter 212 can be received into the top aperture 206b which is used to support objects such as a vehicle. The bottom central portion of the support member 206 includes a scored surface 214 that would engage the top surface of a jack during operation of the device.

Figure 16:
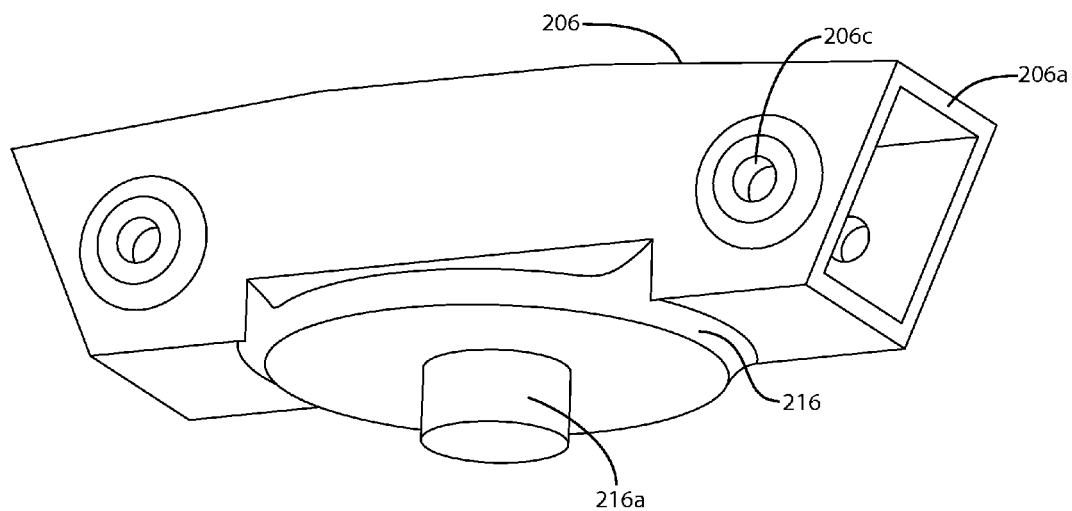
FIG. 16 is a perspective view from below of the middle support member used in the alternate embodiment of the invention shown in FIG. 12.

FIG. 16 shows an alternate embodiment of the support member 206 that has a central bottom plate 216 that includes a cylindrical peg 216a that can engage the top of the jack that has a central circular hole. This eliminates the need for the stock jack saddle, which takes up extra space in very close and tight circumstances. Thus the stock jack saddle can be removed, exposing the central circular hole into which the cylindrical peg 216a can then fit movably, and thus allowing more space for the support member when greater clearance is an objective.

Figure 17:
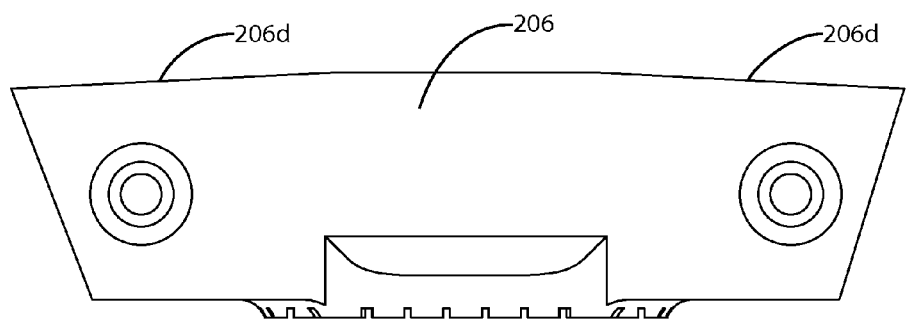
FIG. 17 is a side elevational view of a support member used in the alternate embodiment of the invention shown in FIG. 12.

FIG. 17 shows a side elevational view of the support member 206 and the fact that the top surface is not flat but is tapered from the center downwardly in the area shown as 206d. This helps prevent the outer ends of the support member 206 from coming into contact with the underside of the vehicle or other object being supported.

Figure 18:
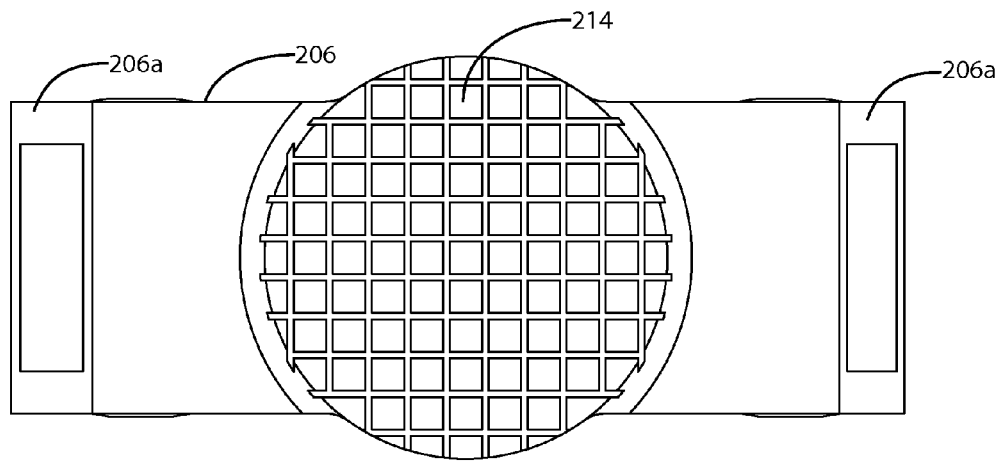
FIG. 18 is a bottom plan view of the mid-support section shown in FIG. 17.

FIG. 18 shows the bottom plan view of the support member 206 and the textured surface 214. The surface area 214 makes a firm contact with the saddle of a lifting device when in use.

Figure 19:
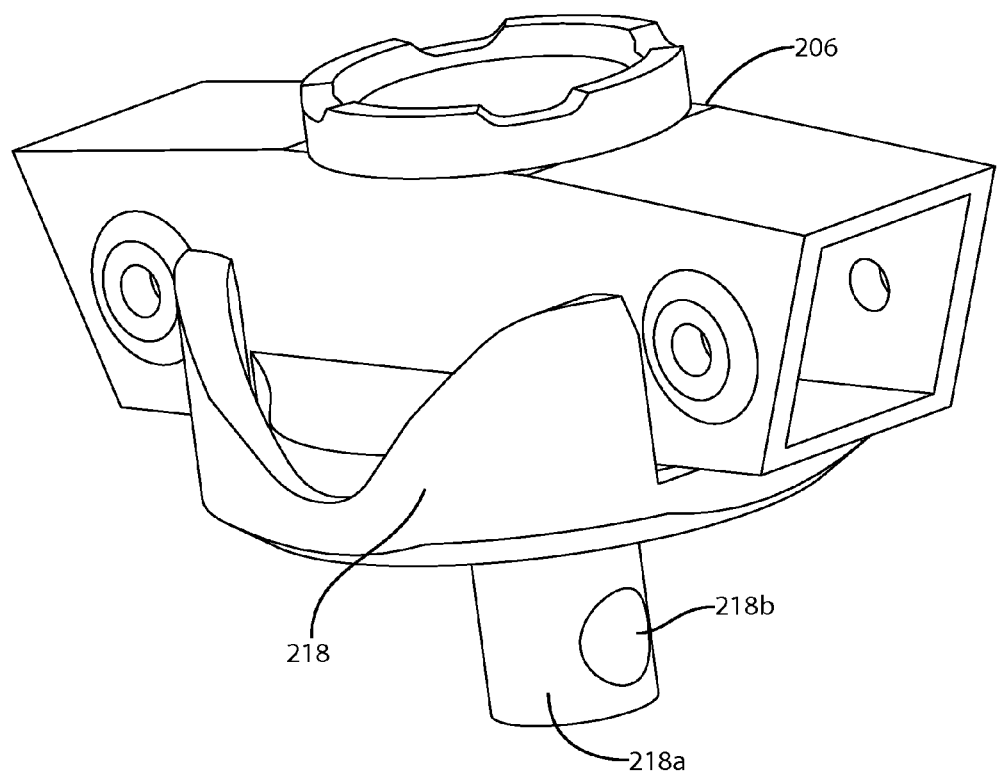
FIG. 19 is a perspective view that shows the mid-support section of the alternate embodiment of the invention shown in FIG. 12 engaged with a jack stand support used to lift the mid-support section device and the car.
Figure 20:
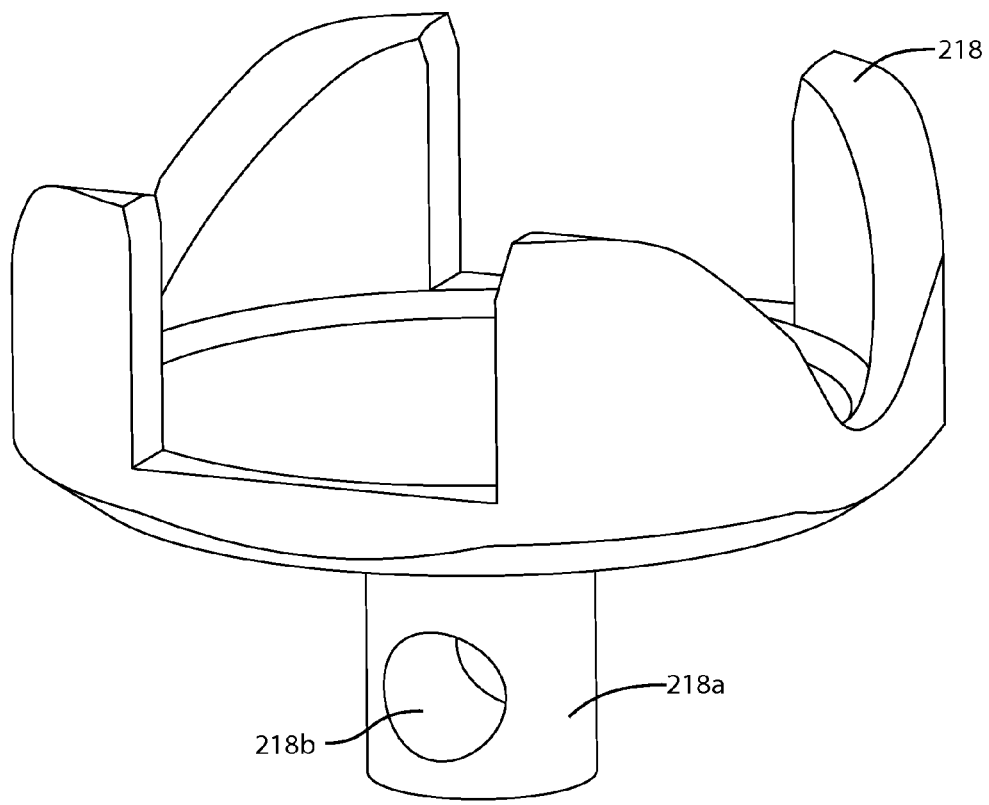
FIG. 20 is a perspective view of a jack stand support member used with the alternate embodiment of the present invention shown in FIG. 12.

FIG. 19 and FIG. 20 show a hydraulic jack replacement saddle 218 that replaces a stock saddle typically fitted to a hydraulic floor jack. The replacement saddle 218 is designed to hold the support member 206 securely and centered. The elongated peg 218a beneath the replacement saddle 218 is shown. This peg 218a is different than the one disclosed earlier in FIG. 15. This peg is longer and has a hole 218b through it to receive the same component which secures a floor jack's original saddle. The shape of the upper portion of the replacement saddle 218 acts as a cradle for the support member 206 for security, leveling, and centering.

Figure 21:
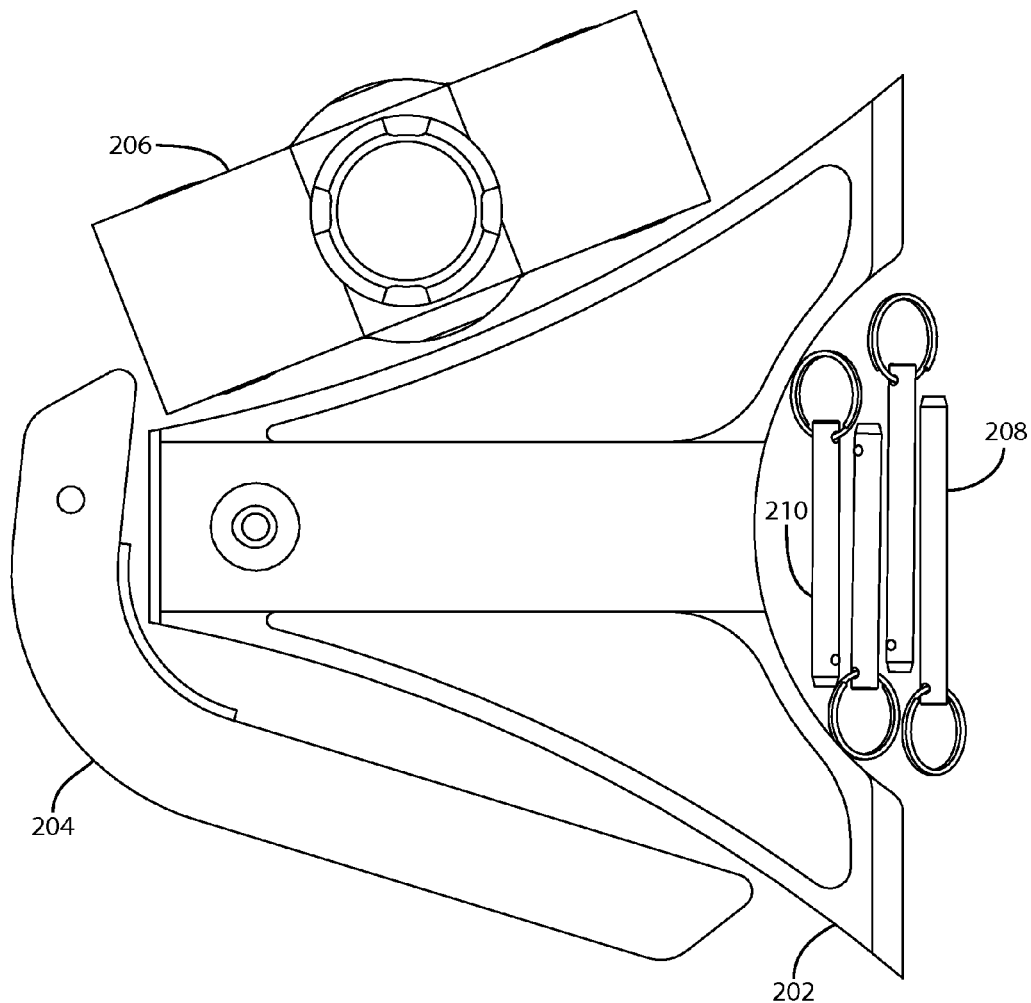
FIG. 21 shows the embodiment of the invention shown in FIG. 12 in which the components are arranged compactly for storage purposes is disassembled.
Figure 22:
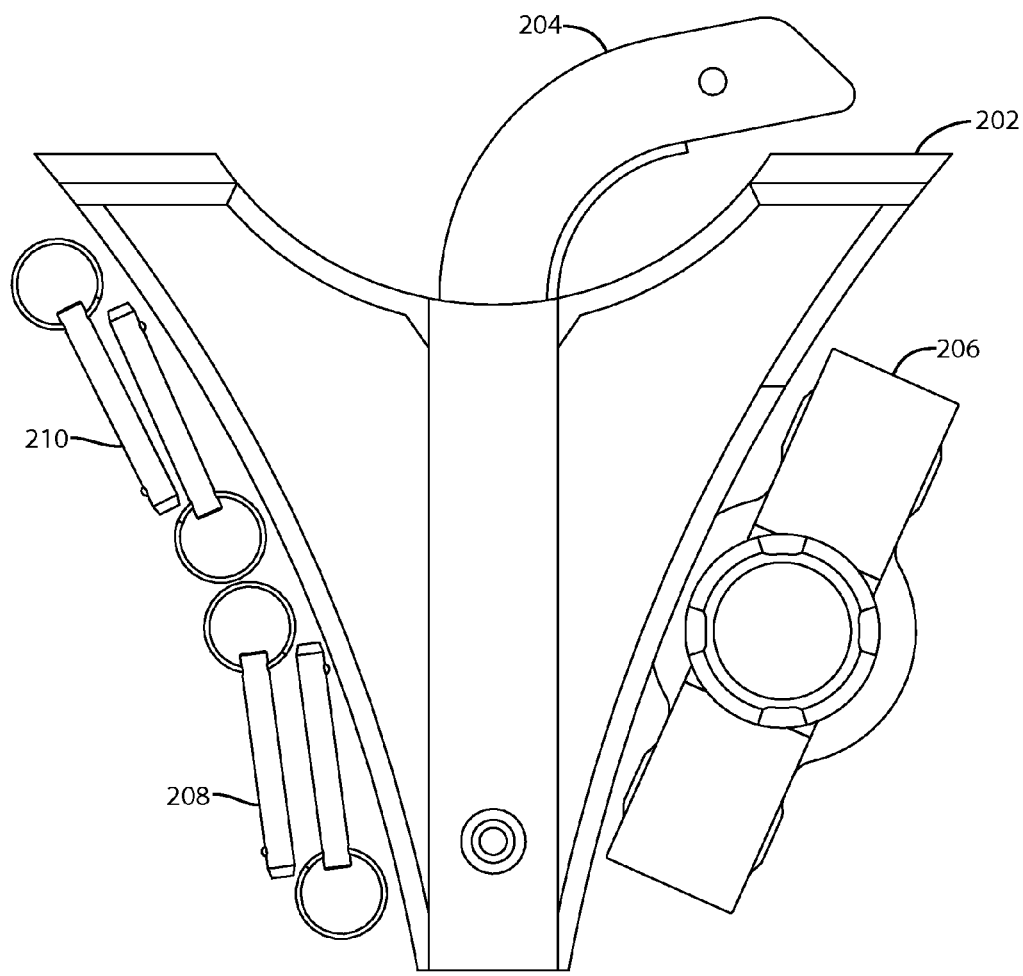
FIG. 22 shows the embodiment of the invention shown in FIG. 12 in which the components of the invention are again arranged in a compact position in which the support ledge is attached to the base for compact storage.

FIG. 21 and FIG. 22 show the weight support device and vehicle support device disassembled and arranged in a storage position for packaging or storage when not in use. By virtue of the shape of some of the different elements such as the trapezoidal base 202, legs 204, and the support member 206, along with pins 208 and 210, the system is easily stored conveniently in a very compact volume when disassembled. The device that is shown disassembled in FIG. 22 shows that the legs are actually telescoped into the bottom end of the base support member for maximum portability.

Figure 23:
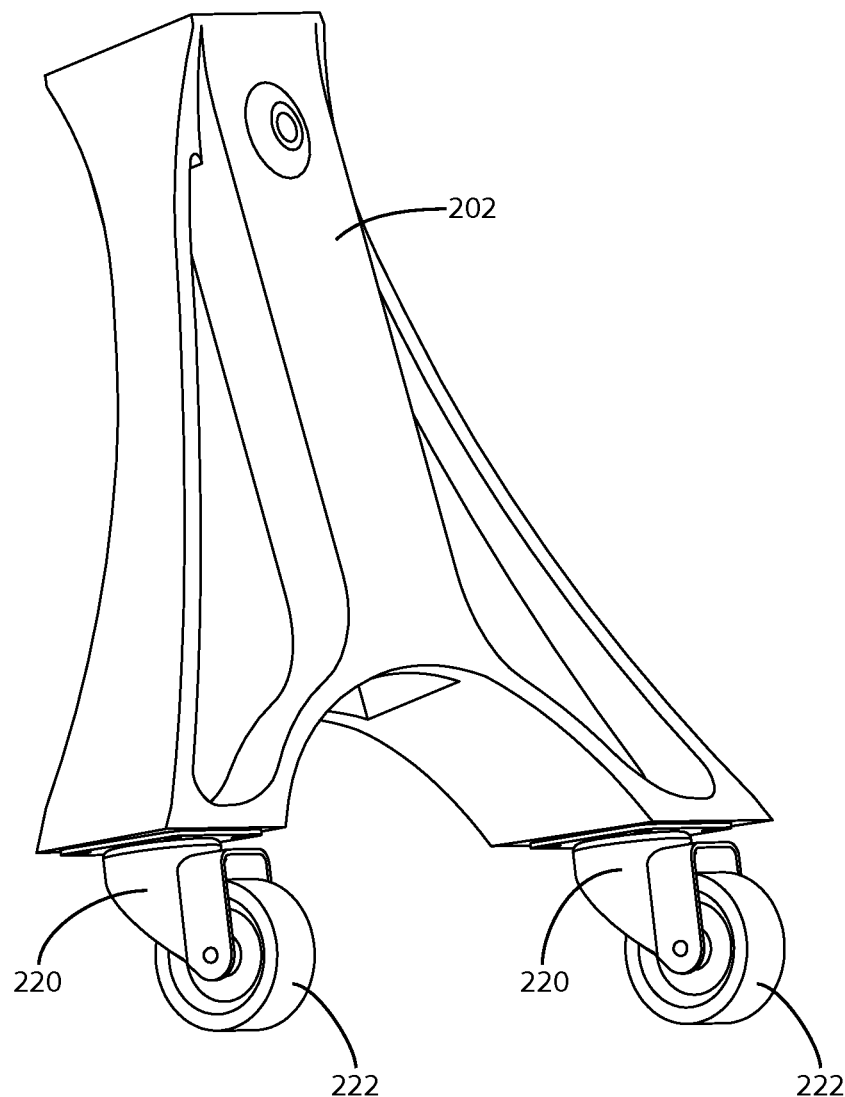
FIG. 23 is a perspective view of an alternate embodiment of the base of the invention that includes the wheels for rolling the device.

FIG. 23 shows a perspective view of the base 202 that may include a pair of wheels 222 that can move pivotally and in all directions and are connected to the very bottom of the base 202 with casters 220. With this embodiment on the support base, the unit when in use could possibly be moved if necessary using wheels 222.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An adjustable weight supporting apparatus comprising:
a horizontal support member body having a first open end and a second open end, said support member body being substantially trapezoidal in cross-section longitudinally comprising a top surface that is longer than a bottom surface for supporting an object and further comprising at least two support member body locking holes;
a pair of legs;
each leg comprising a first end and a second end, wherein each leg first end includes a locking channel, the leg first end being insertable into the support member body first open end by aligning the first leg locking channel with the support member body locking holes, the first end of leg being temporarily fixable by passing a pin through the support member body locking hole and the leg locking channel, and wherein the second end of the leg extends downwardly to a support surface; and
said support member body having an adapter port within the top surface;
an adapter temporarily securable on the support member body to receive an object, the adapter being operatively receivable by said adapter port of the support member body; wherein the support member is engageable by a lifting device.

2. The apparatus of claim 1, including:
said leg first ends being tapered and angularly disposed relative to the longitudinal axis of the leg for easy access and support member body engagability with each leg first end opening in the support member body.

3. The apparatus of claim 2, including:
said adapter including an engaging element on one side for engaging a vehicle firmly and a pin on the opposite side for engaging said support member.

4. The apparatus of claim 1, including:
a pair of support member bases;
said support body member having one or more lateral apertures for receiving a support member locking pin, each of said legs including laterally disposed apertures on each side for receiving said support member locking pins and one or more support member locking pins for locking each leg in firm attachment to one end of said support member body, each of said support member bases having at least one or more lateral apertures and each of said legs having one or more apertures near its second end, each leg being engageable with said support member base and locked together with a pin such that during the jacking operation of lifting the support member vertically to create room between the vehicle and the ground when the jack is lifted a sufficient distance when engaging the location of the support on the vehicle, the legs and support member bases can be added to the support member to create a jack stand sufficient to support a portion of the vehicle when the lifting jack is removed.

5. The apparatus of claim 1, including:

a support base member;

wherein the second end of each leg is adjustably received by said support base member, wherein the support base member engages the leg attached to said support member body, and wherein a height of the apparatus is configurable by temporarily fixing the leg to the support base member at a desired length of insertion.

6. The apparatus of claim 1, including:

said support member body having an upper surface and a lower surface, and includes a friction pad on said lower surface for engaging the top of a lifting jack, said support member being longitudinally tapered from its midsection to allow for more movement when in operation relative to a vehicle.

\* \* \* \* \*